United States Patent [19]

Gäumann et al.

[11] Patent Number: 5,029,538
[45] Date of Patent: Jul. 9, 1991

[54] SEWING MACHINE

[75] Inventors: Alfred Gäumann, Steckborn, Switzerland; Otto Hangarter, Oehningen, Fed. Rep. of Germany

[73] Assignee: Fritz Gegauf A.G., Steckborn, Switzerland

[21] Appl. No.: 354,724

[22] Filed: May 22, 1989

[30] Foreign Application Priority Data

Jun. 6, 1988 [CH] Switzerland ............ 2150/88

[51] Int. Cl.$^5$ ............ D05B 19/00; D05B 3/02
[52] U.S. Cl. ............ 112/121.11; 112/445; 112/453
[58] Field of Search ............ 112/453, 121.11, 121.12, 112/275, 277, 278, 445

[56] References Cited

U.S. PATENT DOCUMENTS

| | | | |
|---|---|---|---|
| 4,469,038 | 9/1984 | Fujikawa | 112/121.11 X |
| 4,480,561 | 11/1984 | Makabe et al. | 112/445 |
| 4,481,507 | 11/1984 | Takiguchi et al. | 112/277 X |
| 4,498,078 | 2/1985 | Yoshimura et al. | 112/277 X |
| 4,531,466 | 7/1985 | Hanyu et al. | 112/453 X |
| 4,677,925 | 7/1987 | Murakami et al. | 112/445 X |

FOREIGN PATENT DOCUMENTS 0270078 11/1988 Japan ............ 112/453

*Primary Examiner*—Peter Nerbun
*Attorney, Agent, or Firm*—Marks Murase & White

[57] ABSTRACT

According to the present invention, there is disclosed a microprocessor for a sewing machine which can be changed over from a normal service mode for controlling sewing operations to a diagnostic mode for controlling diagnostic programs. The drive of the diagnostic programs takes place by actuation of already present selector switches of the sewing machine and the display of the diagnostic results takes place through already present displays of the sewing machine. In order to facilitate the diagnostic, a mask is provided which can be placed on the control and displaying panel of the sewing machine and which contains indications relating to the drive of determined programs and the reading of the results. At least in one case, means are provided in order to enter and store correcting information according to the results of the diagnostic. This provides a simple and multilateral diagnostic capability and the possibility of intervention in the electronics of the sewing machine.

10 Claims, 3 Drawing Sheets

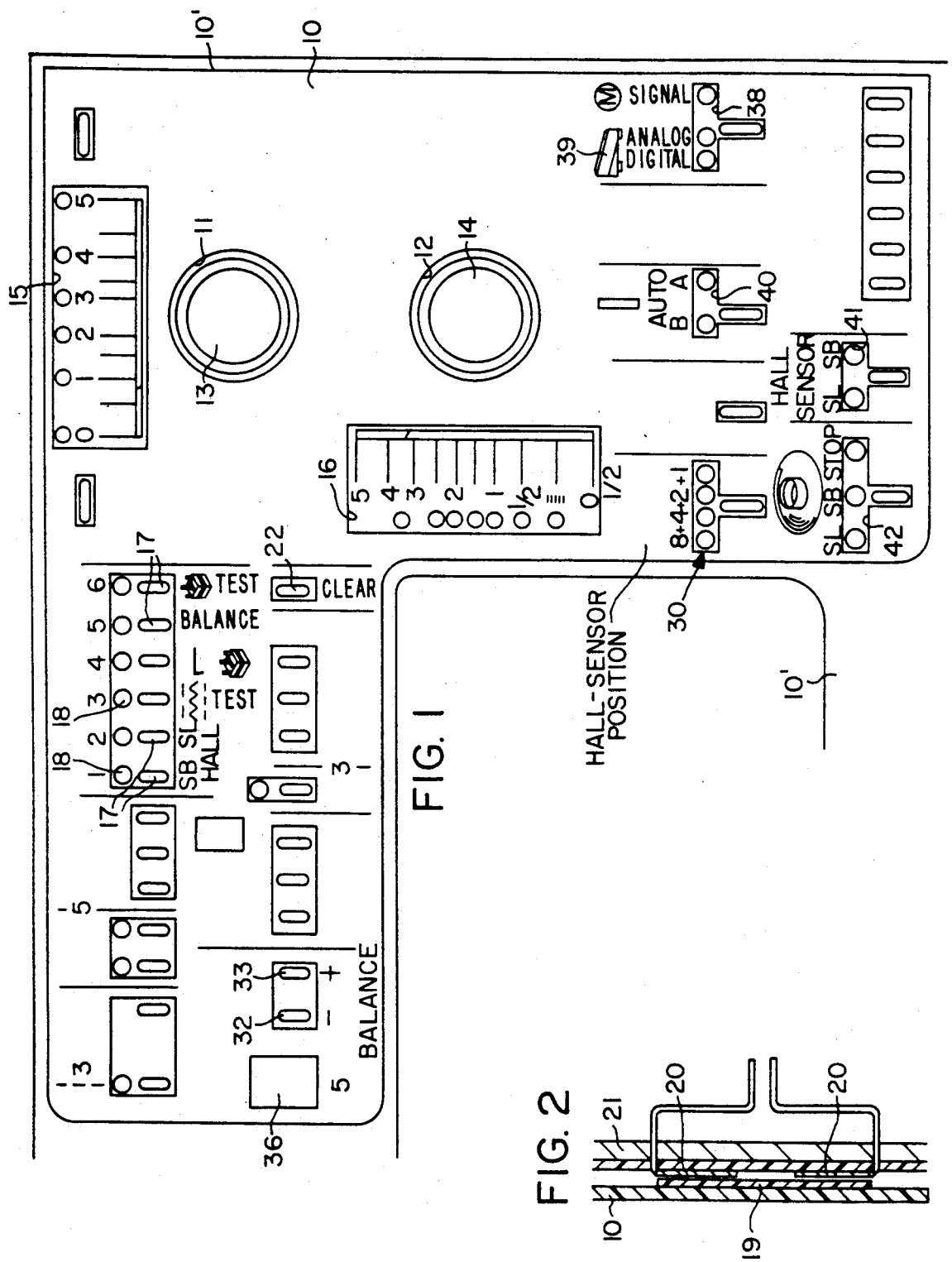

SEWING MACHINE

BACKGROUND OF THE INVENTION

The present invention relates to a sewing machine having a sewing device controlled by a processor, whereby the processor is capable of being switched over from one mode to another wherein in the first mode, control is effected by control programs for the sewing operations and in the second mode, control is effected by diagnostic programs. Sewing machines of this kind are known, e.g., from U.S. Pat. No. 4,393,796 and 4,480,561. However, the diagnostic capabilities of known machines have heretofore been fairly limited and they relate practically exclusively to the operability of certain machine parts.

SUMMARY OF THE INVENTION

It is an object of the present invention to expand the diagnostic capabilities of a sewing machine by providing additional programs.

A first measure for achieving these objectives consists of providing at least one diagnostic program that is capable of simultaneously entering and storing correcting instructions. The entry and the storage of correcting instructions may, in this case, be preferably executed during a sewing process, and more particularly, correcting instructions for null-balance of the forward and backward motion of the feeder may be entered and stored. In this way, it is easily possible, not only to safely obtain a diagnostic of a faulty adjustment or a subsequent misadjustment, but also to remove it without intervening in the machine.

For a sewing machine which is provided with sensors for determining the positions of each of the stepping motors for controlling the stitch length and the stitch width, it is advantageously possible to provide a circuit for displaying the position sensed by each sensor in the region where the steps are to be executed by the associated stepping motor. This display permits checking if the positioning provided by the stepping motors is correct.

Moreover, means can be provided for checking the adjustment of the stitch length, stitch width, position of the stitch field and baste (actuating sewing needle every second or sixth stitch).

It is further possible to provide a diagnostic program in which the motor for controlling the stitch width is brought to its null or central position in order to check the central position of the needle.

It is further possible to provide a diagnostic program in which the control motors, more particularly stepping motors, are alternately accelerated and decelerated, whereby the operability of the motors can be checked. This program is more particularly used during the endurance run of the machine (burn in) at the time of the final check.

It is also known to associate an electronic sewing machine with a diagnostic mask which can be laid on the control and display panel and which contains instructions for the execution of the different diagnostics and for displaying the corresponding results. In accordance with the invention, the setting in place of the mask can actuate a change-over switch or sensor, e.g., a capacitive sensor for switching over the program from the control condition to the diagnostic condition.

The invention will be described further by reference to the drawings.

BRIEF DESCRIPTION OF THE DRAWINGS

FIG. 1 shows a mask laid on the control and display panel of a sewing machine with control and display parts of the sewing machine visible through windows of the mask.

FIG. 2 shows schematically a sensor for sensing the presence of the mask according to FIG. 1.

DETAILED DESCRIPTION OF THE PREFERRED EMBODIMENTS

Figure 3:
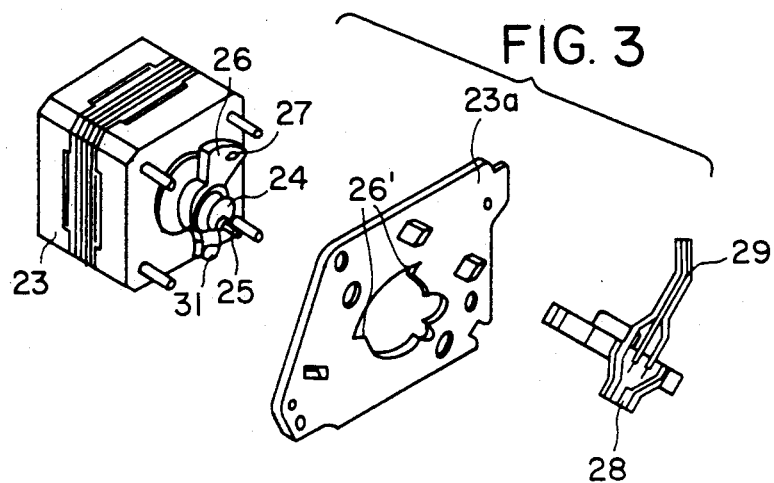
FIG. 3 shows a stepping motor for controlling the stitch length or stitch width by an associated position sensor.

FIG. 1 shows an L-shaped mask 10 of flat material, e.g., a coated carton or similar material. The form and size of this mask corresponds essentially to the form and size of the control and display panel of an electronic sewing machine 10' as illustrated, e.g., in EP-A-88810252.2. The mask comprises different windows (some of which are not particularly designated by a reference numeral and through which determined selected control elements and display elements of the sewing machine are visible. As an example, round windows 11 and 12 are shown through which project the adjusting knobs 13 and 14 for adjustment of the stitch width and stitch length. Display elements for the stitch width and stitch length are visible through windows 15 and 16 of the mask and are associated with the adjusting knobs 13 and 14.

To choose the individual diagnostic programs, pushbuttons 17 are provided. These pushbuttons 17 have another function during normal service of the sewing machine and serve, e.g., for the choosing of decorative or utility stitches. The display lamps or light emitting diodes 18 associated with these pushbuttons 17 serve to display the efficacy of a determined diagnostic program. These programs are designated by numbers from 1 to 6 and the same numbers are repeated at other places on the mask and so designate displays and/or additional actuating elements for the selected program. These displays and actuating elements will be written in accordance with the individual diagnostic programs as far as this appears to be necessary.

Change-over means are provided to permit a change-over of the processor of the sewing machine from the usual operation for controlling the sewing process to the diagnostic operation in accordance with selected programs. To this end, a particular change-over switch can be associated with the sewing machine. Preferably, however, an automatic change-over is executed as soon as the mask 10 is laid on the control and display panel of the sewing machine. In accordance with FIG. 2, there is shown a capacitive sensor which reacts at the time of the setting in place of the mask and provides for the change-over of the function of the processor. The mask bears at the internal side, in this case, a conductive coating 19 which, when the mask is laid on the control and display panel, is opposite to conductive coatings 20 at part 21 of the housing of the sewing machine. When the mask is laid on or removed from the panel, the capacitive value between the coatings 20 changes which changes are evaluated by the electronics of the sewing machine in the sense that for an increased capacity (mask 10 set in place), the microprocessor is placed in the diagnostic operation mode while when the mask is removed, it is switched back again to the sewing operation mode. However, for safety reasons, this change-over is executed only after the sewing machine has been previously stopped. Hence, for the execution of one or many service programs, the machine first has to be stopped, then the mask 10 can be set in place and the sewing machine can again be switched on. In this way the automatic change-over is effected. If in this condition, the CLEAR pushbutton 22 is actuated, the electronics of the machine is in the basic condition of the diagnostic operation or of the service condition. It is then possible to select an arbitrary one of the diagnostic programs 1 to 6 by pressing the associated pushbutton 17 to activate the corresponding program.

The programs 1 and 2 serve to check the position of a Hall-sensor for the stitch length and the stitch width. Both programs are identical with very small differences. At first, the arrangement and the purpose of the Hall-sensors will be explained by reference to FIG. 3. The parts illustrated separately in FIG. 3 are fixedly connected together in their operating condition. The stepping motor 23 comprises a shaft 24 with an eccentric driving pin 25. The eccentric driving pin 25 controls (through rods not shown) the oscillating frame of the needle rod for determining the stitch width. On the motor shaft 24 is mounted a stop boss 26 which serves to limit the rotary motion of the motor shaft by means of stops 26' of a mounting plate 23a for the stepping motor. To the stop boss 26 is fastened a magnet 27 which cooperates with a Hall sensor 28 provided in front of the magnet. For a determined position or number of steps of the stepping motor, the magnet comes opposite to the Hall sensor which then transmits a signal to the microprocessor through the connection 29. By a loosened screw fitting, the stepping motor 23 can be pivoted in a determined domain about the axis of the shaft 24 and then fastened into the desired position with screws to the mounting plate 23a. It could also be necessary to bring the displaced sensor 28 to the correct position.

When program 1 is selected, the stepping motor is adjusted stepwise in order to control the stitch width (SB) and it is determined in which stepping position the Hall sensor 28 is activated. This position, representing a number of steps, is displayed by the four-figure digital display 30 (FIG. 1). Above the individual lamps of this display are indicated the numerical values 1, 2, 4 and 8. The combination of the illuminated lamps corresponds to a number of steps given by the sum of the associated numerical values. In the case of stitch width, it is determined if this number of steps is within a determined domain, e.g., between 1 and 7 which in this particular case guarantees that the stepping motor is positioned correctly. At the same time, the operability of the Hall sensor and the stepping motor is confirmed. If program 2 is selected, a similar precise checking of the stepping motor takes place, to determine the stitch length. If, during this checking, the displayed result falls outside of the prescribed domain, a correction becomes necessary which can take place either by resetting the Hall sensor, which is displaced with respect to the initial position, to the correct position or by changing the angular position of the stepping motor in accordance with the manner mentioned above.

If program 3 is selected, the machine is adjusted to straight stitch which is indicated on the mask 10, at the top left. In this positions, the following adjustments can be made: stitch length, stitch width, stitch field position and baste (in which the machine needle is actuated every second or sixth stitch, e.g.). If program 4 is selected, the stepping motors 23 are used for controlling the stitch width and stitch length with the step word of the mark out position. This mark out position corresponds to a null or middle position of the needle, i.e., a null position of the stitch width. This diagnostic serves uniquely for checking the actual condition. If the position is not correct, mechanical interventions are necessary. If the fault is small, a correction in the rods between the eccentric pin 25 of the stepping motor and the controlled machine part is possible, If the difference is larger, a correction of the angular position of the stepping motor may be necessary. The designation "mark out position" refers to the fact that during production, a very precise adjustment of the position of the stop bosses 26 on the shaft 24 of the motor must take place. To this end, for the null step position of the stepping motor, a pin is introduced through an opening 31 of the stop boss 26 in an opening lying in the rear of the housing of the motor. If the relative position of the stop boss 26 and the motor 23 is not correct, that is if the pin cannot be introduced through both openings, the angular position of the motor must be corrected as mentioned above.

Figure 4:
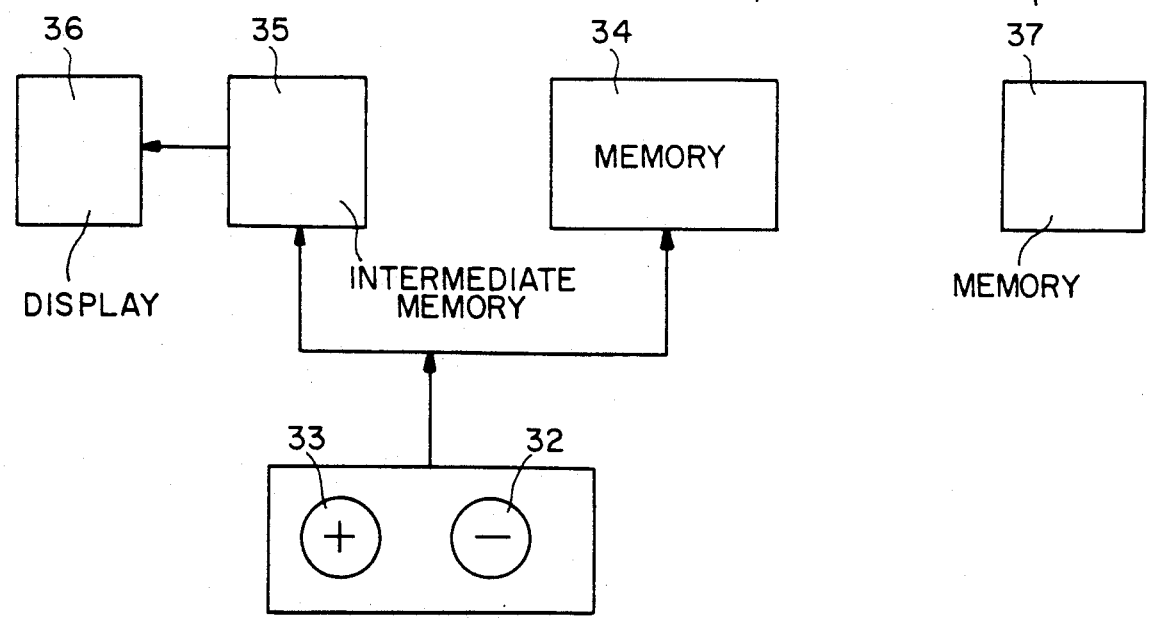
FIG. 4 shows a block-diagram of a circuit for the entry and storage of correcting instructions.

Program 5 serves to check, and as the case may be, to correct the null balance for the forward and backward motion of the feeder. By selecting program 5, the sewing machine is driven for a determined number of turns, so that it is possible to determine if sewing material lies still or if it is transported forward or backward. When the stitch length is set at null, no transport should take place. If however, a certain transport takes place, a correction can be effected by actuation of one of the pushbuttons 32 or 33. If a certain forward motion takes place, a correction can be effected by actuation of the pushbutton 32 designated by "minus", this actuation being executed until the sewing material lies still. If the sewing material is transported backward, the pushbutton 33 designated by "plus" is actuated until the sewing material lies still. This correction is further explained with reference to FIGS. 4 and 5. FIG. 4 shows again the pushbuttons 32 and 33 which are connected to a memory 34 and to an intermediate memory 35. The contents of the intermediate memory 35 are displayed by a display 36. The principal memory 34 contains a number which represents a factor for calculating the stitch length. Another memory 37 contains the momentary offset for the null transport. The sum of the factor contained in the memory 34 and the offset contained in the memory 37 gives the overall factor for the calculation of the stitch length. The memory 37 is a non volatile memory (EEPROM).

Figure 5:
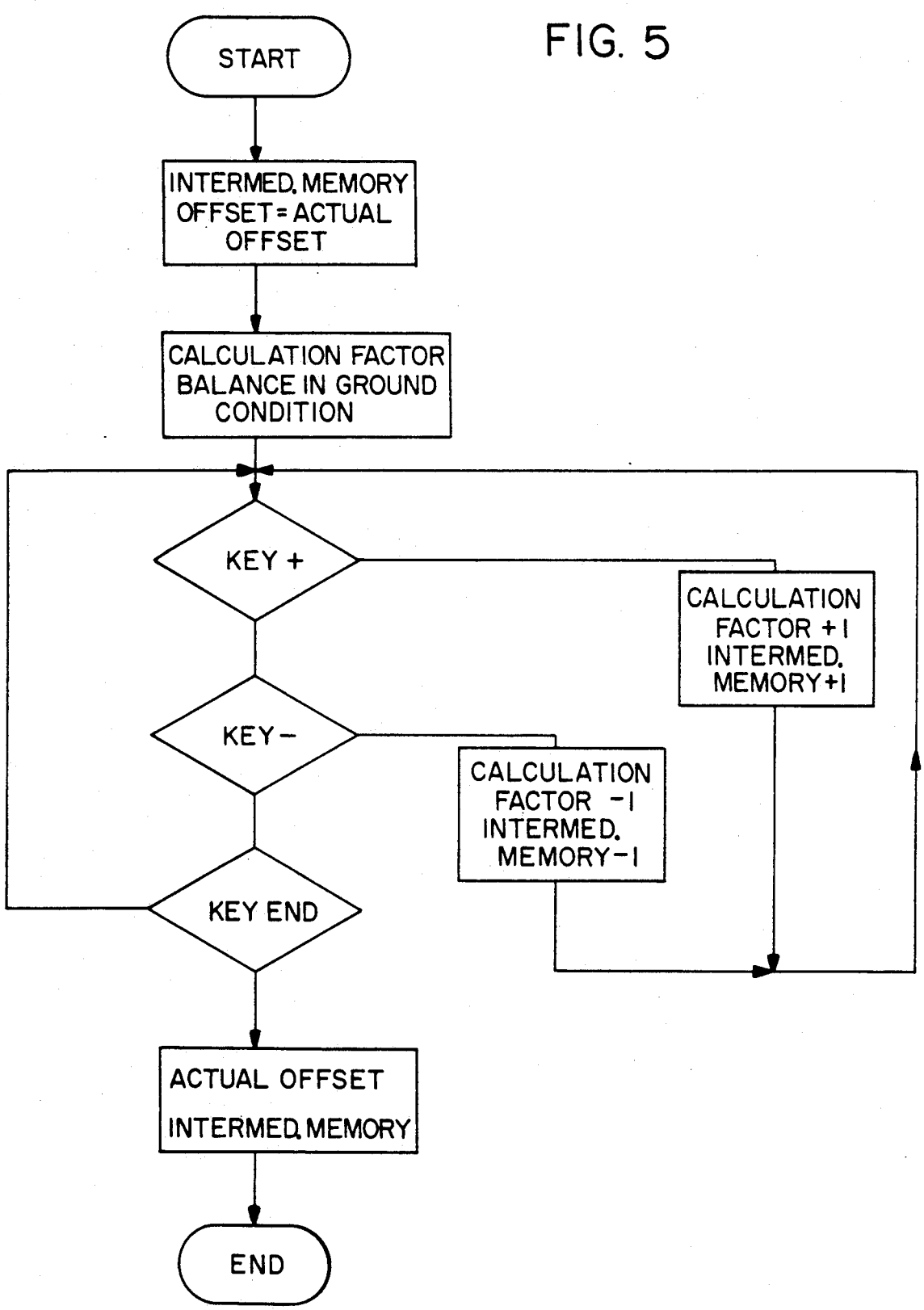
FIG. 5 shows a flow chart which illustrates the entry and storage of correcting instructions.

FIG. 5 illustrates the correcting process in flow chart form. At each actuation of the key 33, the calculation factor is increased by one unit while at each actuation of the key 32, the calculation factor is decreased by one unit.

In addition to the diagnostic programs 1to 6, further checkings may be executed. In a window 38 of the mask, lamps are visible which digitally display by their lights that an analog control signal from the foot pedal 39 is correctly transmitted to the microprocessor. Further, a display indicates that the motor (M) receives a corresponding signal. By means of a display visible in window 40 of the mask 10, it is possible to check if, for an automatic sewing of a button hole indicated above the display 40, an effective pick-up operates satisfactorily. It is possible to indicate in window 41 if the above mentioned Hall sensors operate satisfactorily. In window 42, lamps are visible which are driven by a pick-up of a position code for the principal shaft of the sewing machine, the position code being indicated above the window 42. The lamps in window 42 permit the checking of the correction function of the position pick-up which is a necessary condition that causes certain mutual locks to operate, which means that, e.g., the needle will not execute a zig-zag motion when it is engaged in the sewing material. The individual keys for actuating the various controls and displays are not designated and described individually. It is uniquely mentioned that through the various pushbuttons, a variety of different checkings are implemented and corresponding displays are activated.

We claim:

1. A sewing machine controllable by a processor, comprising:
    mode selection means for selectively switching said processor from an operation mode, wherein sewing operations may occur, to a diagnostic mode wherein one of a plurality of diagnostic programs may be actuated; and diagnostic means responsive to one of said diagnostic programs for diagnosing an operating parameter of said sewing machine and for generating and storing correction information for correcting said operating parameter.

2. The sewing machine of claim 1, wherein said diagnostic means is operable for generating and storing correction information during a sewing operation.

3. The sewing machine of claim 2, wherein one of said diagnostic programs comprises a null balance correction program;
    and further comprising means for correcting the null balance of the forward and backward motion of a feeder of said sewing machine by entering and storing null balancing correction information.

4. The sewing machine according to claim 1, further comprising mask means adapted to be placed on a control and display panel of said sewing machine, and switch means, actuated by the placing of said mask means on said machine, for switching the processor from said operation mode to said diagnostic mode.

5. The sewing machine of claim 1, further comprising:
    motor means for controlling stitch length and stitch width of a sewing operation;
    sensor means for sensing a predetermined position of said motor means; and
    display means for displaying the position sensed by said sensor means.

6. The sewing machine of claim 1, wherein said diagnostic means comprises means for controlling a motor for determining the stitch width so that a part of said motor is in a null position thereby checking the null position of a needle of the sewing machine.

7. The sewing machine of claim 1, wherein said diagnostic means comprises:
    means for alternately causing a control motor to be moved forward and backward; and
    display means for displaying an indication of the operability of said motor.

8. A sewing machine controllable by a processor, comprising:
    mode selection means for selectively switching said processor from an operation mode, wherein sewing operations may occur, to a diagnostic mode wherein one of a plurality of diagnostic programs may be activated;
    means responsive to said one of a plurality of diagnostic programs for determining the stitch length, stitch width, stitch field position and baste of a sewing operation.

9. A sewing machine controllable by a processor, comprising:
    mode selection means for selectively switching said processor from an operation mode, wherein sewing operations may occur, to a diagnostic mode, wherein one of a plurality of diagnostic programs may be actuated and
    diagnostic means responsive to one of said diagnostic programs for diagnosing an operating parameter of said sewing machine,
    mask means adapted to be placed on a control and display panel of said sewing machine, and switch means actuated by the placing of said mask means on said machine, for switching the processor from said operation mode to said diagnostic mode.

10. A sewing machine according to claim 9, wherein said switch means comprises capacitive switch means actuated by the placing of said mask means on said machine.

* * * * *